United States Patent
Brinkman et al.

(10) Patent No.: US 10,688,975 B2
(45) Date of Patent: Jun. 23, 2020

(54) METHOD AND APPARATUS FOR PARKING BRAKE HOLD ASSIST IN A MOTOR VEHICLE

(71) Applicant: GM GLOBAL TECHNOLOGY OPERATIONS LLC, Detriot, MI (US)

(72) Inventors: Todd J. Brinkman, Rochester, MI (US); John W. Pennala, Howell, MI (US); Eric E. Krueger, Chelsea, MI (US); Harold B. Thibodeau, Troy, MI (US); Frank R. Bruneel, II, Clinton Township, MI (US)

(73) Assignee: GM GLOBAL TECHNOLOGY OPERATIONS LLC, Detriot, MI (US)

( * ) Notice: Subject to any disclaimer, the term of this patent is extended or adjusted under 35 U.S.C. 154(b) by 133 days.

(21) Appl. No.: 15/994,475

(22) Filed: May 31, 2018

(65) Prior Publication Data

US 2019/0366990 A1    Dec. 5, 2019

(51) Int. Cl.
*B60T 8/17*    (2006.01)
*B60T 7/12*    (2006.01)

(52) U.S. Cl.
CPC .............. *B60T 8/17* (2013.01); *B60T 7/12* (2013.01); *B60T 2201/06* (2013.01)

(58) Field of Classification Search
CPC ........... B60T 8/17; B60T 7/12; B60T 2201/06
See application file for complete search history.

(56) References Cited

U.S. PATENT DOCUMENTS

| 2007/0225117 | A1* | 9/2007 | Shimizu | B60T 7/12 477/182 |
| 2015/0224969 | A1* | 8/2015 | Huennekens | B60T 8/17 701/48 |
| 2016/0101766 | A1* | 4/2016 | Hu | B60T 7/122 701/70 |
| 2018/0215355 | A1* | 8/2018 | Kinder | B60T 7/12 |

* cited by examiner

*Primary Examiner* — Aaron L Troost
(74) *Attorney, Agent, or Firm* — Lorenz & Kopf, LLP

(57) ABSTRACT

The present application generally relates to a method and apparatus for application of a park hold assist system in a motor vehicle. In particular, the system is operative to receive an activation signal and to determine that the vehicle is in a park hold assist condition, such as inclined road surface, attached trailer or wheel rotation while transmission is in the park position. The system is operative to apply the hydraulic brakes in response to this condition thereby engaging a brake mechanism on all wheels.

20 Claims, 3 Drawing Sheets

METHOD AND APPARATUS FOR PARKING BRAKE HOLD ASSIST IN A MOTOR VEHICLE

BACKGROUND

The present disclosure relates generally to an electronic park brake function for use with a vehicle. More specifically, aspects of the present disclosure relate to systems, methods and devices for assisting a parking brake application engaged on a slope wherein the hydraulic braking system may be engaged to brake all wheels when a slip condition, trailering or boat launch condition is determined.

When a rear wheel drive vehicle transmission is placed into park, a park pawl in the transmission is applied typically to the transmission output shaft, thereby locking the drive shaft. In this parked configuration, the holding force of the vehicle is limited to the rear wheel with the least traction. Likewise, when a typical parking brake system is applied, typically the brake pads of the two rear wheels of the vehicle are engaged to lock the rear wheels. However, on each of these scenarios, the front wheels provide no holding force.

A problem arises when a driver engages the park pawl or the parking brake on a sloped surface such as a boat ramp. On a boat ramp, the rear tires of the vehicle are typically submerged or are one a slippery surface when the vehicle is parked when the operator exits the vehicle in order to launch the boat. The operator may not be aware that the holding force can go from all four wheels when the hydraulic brakes are engaged to rear only when the brake pedal is released. It would be desirable to have maximum holding power when a vehicle is parked on a slippery slope.

The above information disclosed in this background section is only for enhancement of understanding of the background of the invention and therefore it may contain information that does not form the prior art that is already known in this country to a person of ordinary skill in the art.

SUMMARY

Disclosed herein are vehicle braking methods and systems and related control logic for provisioning vehicle braking control systems, methods for making and methods for operating such systems, and motor vehicles equipped with onboard control systems. By way of example, and not limitation, there is presented various embodiments of an all wheel parking brake assist module, and a method for detecting a potential assist condition and engaging a parking brake assist in response to the detection are disclosed herein.

In accordance with an aspect of the present invention, a method of receiving an operational state control signal indicating an on state, determining a park hold assist condition, generating a first brake control signal to activate a four wheel brake system in response to the operational state control signal and the park hold assist condition, detecting a state change in at least one of the operational state control signal and the park hold assist condition, and generating a second brake control signal to deactivate the four wheel brake system in response to detecting the state change.

In accordance with another aspect of the present invention an apparatus comprising a user interface for receiving a user input and generating an operational state control signal, a sensor for determining a park assist condition and generating a data indicating the park assist condition, a four wheel brake system for performing a park hold assist in response to a first brake control signal and deactivating the park hold assist in response to a second brake control signal, and a controller for receiving the operational state control signal indicating an on state, accessing the data indicating the park assist condition and generating a first brake control signal to activate a four wheel brake system in response to the operational state control signal and the park hold assist condition, the controller being further operative to detect a state change in at least one of the operational state control signal and the park hold assist condition and generating a second brake control signal to deactivate the four wheel brake system in response to detecting the state change.

In accordance with another aspect of the present invention a method of engaging a park assist system comprising receiving an activation signal from a user interface, determining a park assist condition, and generating a park assist control signal in response to reception of the activation signal and determination of the park assist condition wherein a four wheel brake system is activated in response to the park assist control signal.

The above advantage and other advantages and features of the present disclosure will be apparent from the following detailed description of the preferred embodiments when taken in connection with the accompanying drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
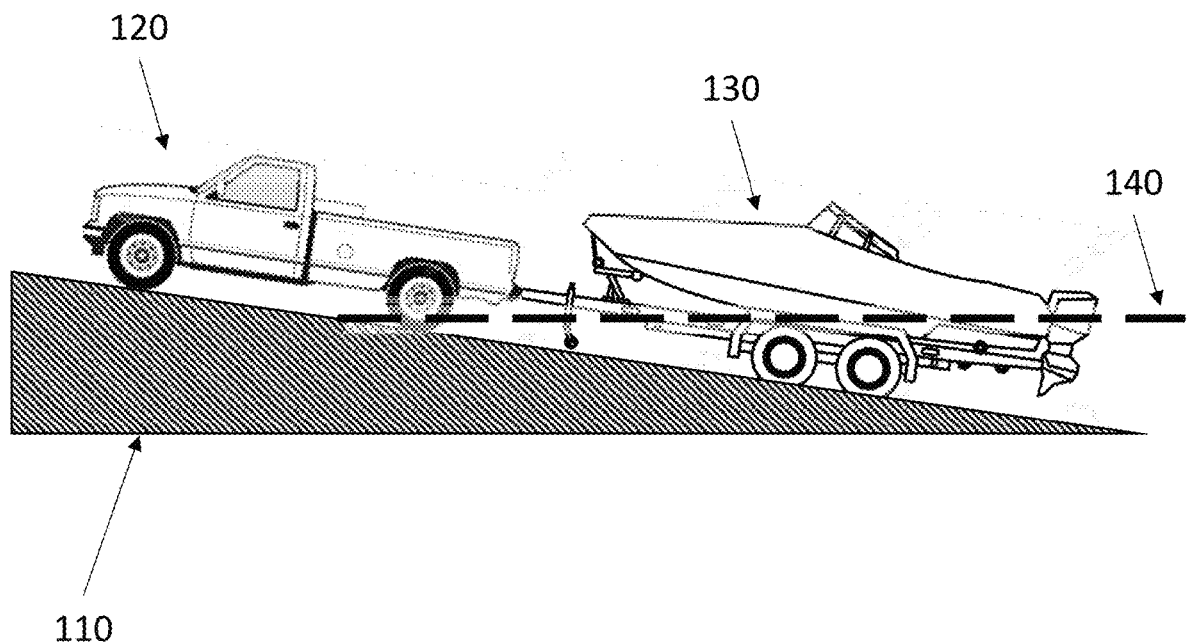
FIG. 1 illustrates an exemplary application of the method and apparatus for parking brake hold assist in a motor vehicle according to an exemplary embodiment.

FIG. 1 schematically illustrates an exemplary application of the method and apparatus for parking brake hold assist in a motor vehicle 100 according to the present disclosure. In this exemplary embodiment, a vehicle 120 is stopped on a boat launch 110 with a boat trailer 130 attached wherein the wheels of the boat trailer 130 and the rear wheels of the vehicle 120 are partially submerged below the water line 140. It is desirable to utilize the available vehicle brakes to maximize tractive force in order to resist the vehicle 120 from sliding on the sloped ramp surface 110. In addition, electric trailer brakes may also be applied if available. For example, when rear wheel drive vehicles, or four wheel drive vehicles in two wheel drive mode are parked on a slippery surface, such as a boat ramp 110, traction can be an issue because the rear wheels are more prone to be on the wet and slippery part of the ramp. Front tires provide no traction when the vehicle is in park, and the parking brake is applied. In some cases, gravity can pull the truck and trailer down the ramp, into the water while the rear tires slide, and the front tires roll freely.

Increased tractive holding force will reduce the likelihood that the vehicle will slide into the water on a slippery boat launch. This will reduce the likelihood of drowning of the driver, passengers or pets. It will reduce the likelihood of vehicle damage due to being submerged, boat Damage and/or hazardous material spill.

Figure 2:
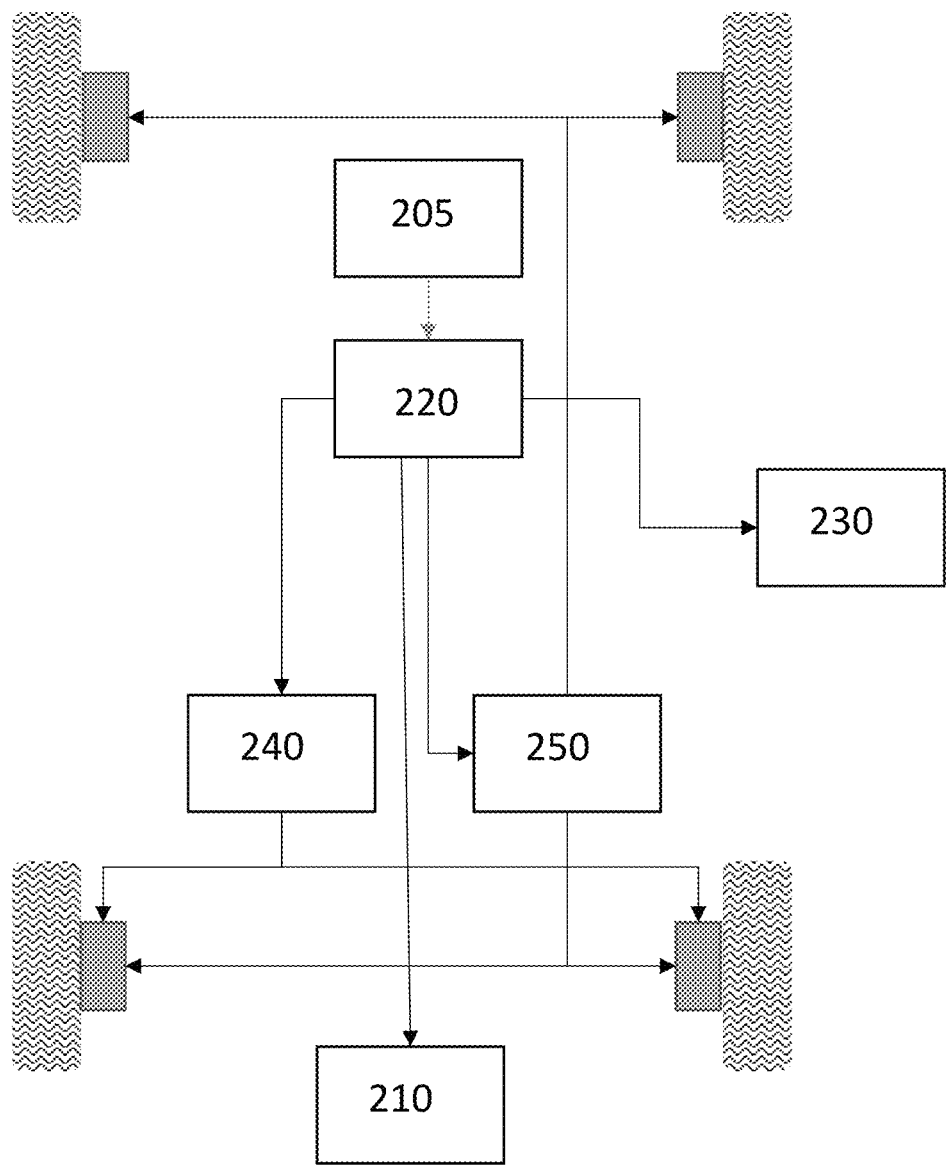
FIG. 2 shows a block diagram illustrating an exemplary system for applying a four wheel park hold assist according to an exemplary embodiment.

Turning now to FIG. 2, a block diagram illustrating an exemplary system for applying a four wheel park hold assist 200 is shown. In particular, the system is operative to receive an activation signal from a user interface 205, such as a switch and to determine that the vehicle is in a park hold assist condition, such as inclined road surface, attached trailer or wheel rotation while transmission is in the park position. The system is operative to apply the hydraulic brakes in response to this condition thereby engaging a brake mechanism on all wheels.

The user interface 205 is operative to receive a user input and generate an operational state control signal. The operational state control signal may indicate an enablement of the method and apparatus for park hold assist, or the operational state control signal may indication a suspension of the method and apparatus. For example, the method for park hold assist may be enabled by default, and a user may wish to override the condition under certain circumstances. The user interface 205 may be a selection switch, a software selection enabled on a program displayed on a touch screen or the like. The user interface 205 may transmit a control signal, or may response to a polling request or the like from the controller 220.

The sensor 230 used for determining a park assist condition and generating a data indicating the park assist condition may include one or more sensors in a sensor suite. Exemplary embodiments of the sensor 230 may include a switch indication a park state or a detector for detecting a parking brake being engaged. The sensor 230 may also include a wheel spin sensor indicating that a wheel is rotating when the vehicle is desired to be stationary. For example, the user may place the vehicle transmission into park, exit the vehicle, and one or more of the wheel sensors may indicate that the wheel is rotating, indicating that the one vehicle hold wheel from the transmission has lost traction and the vehicle is sliding.

Exemplary park hold conditions determined in response to the sensor data may include a group slope of 12 to 15 percent, or seven to eight and one half degrees which may indicate a boat ramp. Boat ramps are notoriously slippery for the rear wheels of the tow vehicle. Such a tow vehicle may benefit greatly from the presently disclosed system and method. Additional park hold conditions may include, alone or in combination, the vehicle transmission set to park, engine running, brake pedal not applied, trailer attached signal latched, and the like. Alternatively, global positioning system data and/or map data may be use to determine that the vehicle is in a slip position, such as at a boat launch or on a hill.

A four wheel brake system 250 is a system that applies brakes to all four wheels simultaneously. This may include a conventional hydraulic braking system, a specialized four wheel parking brake system or four independent drive shaft locks for four independent drive wheels, or the like. The four wheel braking system is conventionally used for stopping the vehicle when the vehicle is operational and is not conventionally used when the vehicle is parked or unoccupied. The four wheel brake system 250 of the exemplary embodiment is employed for performing a park hold assist in response to a first brake control signal and deactivating the park hold assist in response to a second brake control signal. For example, the system may be operational to detect that the vehicle transmission has been placed in the park position. The system may then determine that one or more wheels are rotating, thereby indicating that the vehicle is slipping while parked. The vehicle control system may then apply the four wheel brake system 250 in order to have all four wheels apply traction and stop the slipping. The vehicle control system may apply the four wheel brake system 250 until a user deactivates or clears the system, or for a period of time, wherein after the time period has expired, the vehicle control system releases the four wheel brake system 250 and monitors the wheel spin sensors or the like to determine if the vehicle continues to slip. Alternatively, the method may utilize four electric propulsion motors to maintain position and or resist wheel rotation. This may be utilized in a similar four wheel drive propulsion system.

The system further includes a controller 220 for receiving the operational state control signal indicating an on state, accessing the data indicating the park assist condition and generating a first brake control signal to activate a four wheel brake system 250 in response to the operational state control signal and the park hold assist condition. The controller 220 may also be operative to detect a state change in at least one of the operational state control signal and the park hold assist condition and generating a second brake control signal to deactivate the four wheel brake system 250 in response to detecting the state change. The controller 220 may communicate directly with the four wheel drive brake system 250 or may communicate with a vehicle control system or the like. For example, the controller 220 may receive data via a vehicle communications bus and transmit control signals via the vehicle communications bus in order to communicate with a brake controller, sensor, user interface, or the like.

A trailer detection system 210 is a sensor or the like operative to detect if a vehicle has a trailer attached. This may be accomplished by an active sensor, such as a trailer electrical plug detector or trailer communications device, a load sensor on the trailer hitch, a rear facing camera, lidar, radar, IR detector or the like. The trailer detection system 210 may transmit a signal indicating a trailer connection status, or may respond to a poll from the vehicle control system or the controller 220.

The parking brake system 240 is a conventional system used to engage one or two brake mechanisms in a mechanical manner, such as cables and a lever, or the like, to engage the brake system when the vehicle is not running. These systems alone suffer from the very problem addressed by the present application in that all four brake mechanisms are not engaged when the parking brake system 240 is engaged.

Figure 3:
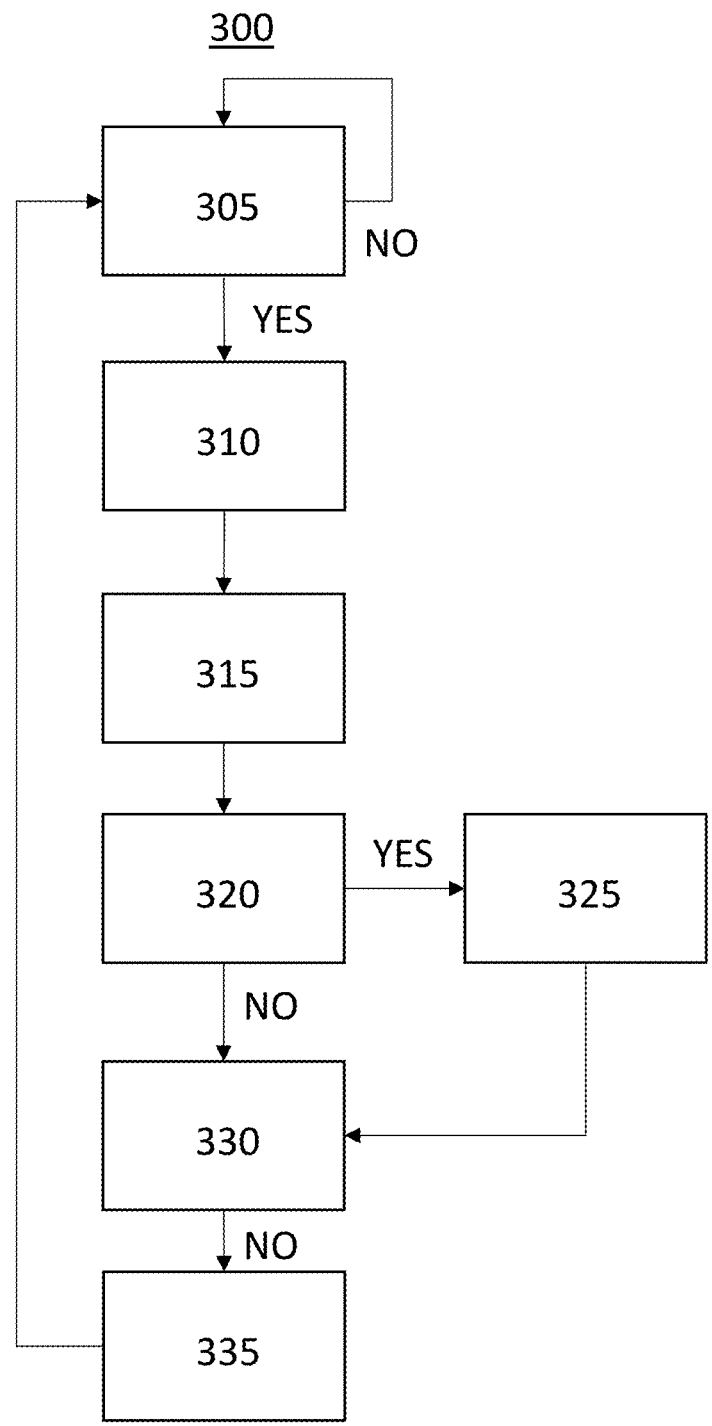
FIG. 3 shows a flowchart illustrating an exemplary method for applying four wheel parking hold assistance according to another exemplary embodiment.

Turning now to FIG. 3, a flowchart illustrating an exemplary method for applying four wheel parking hold assistance 300 is shown. The method is first operative to wait to receive a control signal indicating an operation mode 305. If the method does not receive the control signal, it returns to monitoring for the control signal 305. If the method does receive the control signal, it then determines if the conditions for parking hold assist are met 310, including that vehicle is on a slope, that the vehicle transmission shifter has been placed in the park position or that the parking brake has been engaged, that the engine is running, that the brake pedal is not currently being applied. If the conditions are met, the method is operative to generate a control signal in order to apply the hydraulic brakes to one or more additional wheels 315. In an exemplary embodiment, the hydraulic brakes are allied to all four wheels in response to the control signal. The method is then operative to determine if a trailer is attached my monitoring a trailer attached indication signal 320. If a trailer attached indication signal is received, the method is operative to generate a control signal to request application of a trailer brake 325. The method is then operative to determine if the conditions for parking hold assist are still being met 330. If a trailer attached indication signal is not received, the method is operative to determine if the conditions for the parking hold assist are still being met. If the conditions for parking hold assist are not being met, a control signal is generated to stop application of hydraulic brakes and a control signal is generated to stop application of the trailer brake if applicable 335. The method is then operative to return to waiting to receive a control signal indicating an operation mode 305.

The method may optionally be enabled to first determine that a parking mode has been selected either through putting the vehicle in park or applying the parking brake. The controller 220 may be enabled to monitors a free wheel rotation sensor and determines that the vehicle is sliding while the parking mode is active. The vehicle may autonomously applies the hydraulic vehicle brakes in response to the detection of free wheel rotation. Vehicle generates a horn light alert (warning to the user). In addition, the controller may initiate a driver indication message (DIC) indicating application of the four wheel braking system and requiring a user input to release the application.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method comprising:
   receiving an operational state control signal indicating an on state;
   determining a park hold assist condition wherein the park hold assist condition is indicative of an inclined road surface, a park selection of a transmission and an attached trailer to a host vehicle;
   generating a first brake control signal to activate a four wheel brake system in response to the operational state control signal and the park hold assist condition;
   detecting a state change in at least one of the operational state control signal and the park hold assist condition; and
   generating a second brake control signal to deactivate the four wheel brake system in response to detecting the state change.

2. The method of claim 1 wherein the park hold assist condition is indicative of a road grade greater than ten degrees.

3. The method of claim 1 wherein the park hold assist condition indicative of the attached trailer to the host vehicle is detected by a trailer detection system.

4. The method of claim 1 wherein the park hold assist condition is indicative of the park selection of a transmission is determined in response to a controller via a vehicle communications bus.

5. The method of claim 1 wherein the park hold assist condition is indicative of an engaged parking brake.

6. The method of claim 1 further comprising generating a trailer control signal to engage a trailer brake in response to the park hold assist condition indicating the attached trailer to the host vehicle.

7. The method of claim 1 wherein the park hold assist condition is indicative of a tire rotation.

8. An apparatus comprising:
   a user interface for receiving a user input and generating an operational state control signal;
   a sensor for determining a park assist condition and generating a data indicating the park assist condition, wherein the park hold assist condition is indicative of an inclined road surface, a park selection of a vehicle transmission and an attached trailer to a host vehicle;
   a four wheel brake system for performing a park hold assist in response to a first brake control signal and deactivating the park hold assist in response to a second brake control signal; and
   a controller for receiving the operational state control signal indicating an on state, accessing the data indicating the park assist condition and generating a first brake control signal to activate a four wheel brake system in response to the operational state control signal and the park hold assist condition, the controller being further operative to detect a state change in at least one of the operational state control signal and the park hold assist condition and generating a second brake control signal to deactivate the four wheel brake system in response to detecting the state change.

9. The apparatus of claim 8 wherein the park hold assist condition is indicative of a road grade greater than ten degrees.

10. The apparatus of claim 8 wherein the park hold assist condition indicative of the attached trailer to the host vehicle is detected by a trailer detection system.

11. The apparatus of claim 8 wherein the park hold assist condition indicative of the park selection of the vehicle transmission is determined in response to a controller via a vehicle communications bus.

12. The apparatus of claim 8 further comprising a vehicle parking brake and wherein the park hold assist condition is indicative of an engaged vehicle parking brake.

13. The apparatus of claim 8 further comprising a trailer detection sensor for generating a trailer control signal to engage a trailer brake in response to the park hold assist condition indicating the attached trailer to the host vehicle.

14. A method of engaging a park assist system comprising:
- receiving an activation signal from a user interface;
- determining a park assist condition, wherein the park hold assist condition is indicative of an inclined road surface, a park selection of a transmission and an attached trailer to a host vehicle; and
- generating a park assist control signal in response to reception of the activation signal and determination of the park assist condition wherein a four wheel brake system is activated in response to the park assist control signal.

15. The method of claim 14 wherein the park assist condition is indicative of a road grade greater than ten degrees.

16. The method of claim 14 wherein the park assist condition is indicative of an attached trailer to a host vehicle detected by a trailer detection system.

17. The method of claim 14 wherein the park assist condition is determined in response to a controller via a vehicle communications bus.

18. The method of claim 14 wherein the park assist condition is indicative of an engaged parking brake.

19. The method of claim 14 further comprising generating a trailer control signal to engage a trailer brake in response to the park assist condition indicating the attached trailer to the host vehicle.

20. The method of claim 14 wherein the park assist condition is indicative of a tire rotation.

\* \* \* \* \*